US011197431B2

(12) United States Patent
Treville

(10) Patent No.: US 11,197,431 B2
(45) Date of Patent: Dec. 14, 2021

(54) METHODS AND CONFIGURATIONS OF A GROWING CONTAINER

(71) Applicant: STOREX CA CONTROLLED ATMOSPHERE INC, Montreal (CA)

(72) Inventor: Louis-Christophe Treville, Montreal (CA)

(73) Assignee: GGMJ CULTIVATION INC., Quebec (CA)

( * ) Notice: Subject to any disclaimer, the term of this patent is extended or adjusted under 35 U.S.C. 154(b) by 0 days.

(21) Appl. No.: 16/597,834

(22) Filed: Oct. 9, 2019

(65) Prior Publication Data

US 2021/0259159 A1 Aug. 26, 2021

(51) Int. Cl.
*A01G 9/02* (2018.01)
*B65D 25/28* (2006.01)
*B65D 21/02* (2006.01)
*A01G 9/00* (2018.01)

(52) U.S. Cl.
CPC ......... *A01G 9/024* (2013.01); *B65D 21/0233* (2013.01); *B65D 25/2811* (2013.01); *A01G 2009/003* (2013.01)

(58) Field of Classification Search
CPC ........ A01G 9/024; A01G 9/022; A01G 9/023; A01G 9/025; A01G 2009/003
See application file for complete search history.

(56) References Cited

U.S. PATENT DOCUMENTS

| 608,590 | A | * | 8/1898 | Freund | A01G 9/02 47/75 |
| 5,393,425 | A | * | 2/1995 | Cobb, Jr. | A01G 25/00 210/461 |
| 6,363,658 | B1 | * | 4/2002 | Lai | A01G 27/06 119/246 |
| 6,505,440 | B1 | * | 1/2003 | Lai | A01G 27/06 47/79 |
| 9,930,840 | B1 | * | 4/2018 | Gergek | A01G 27/02 |
| 2011/0162273 | A1 | * | 7/2011 | Mittelmark | A01G 27/00 47/66.7 |

(Continued)

FOREIGN PATENT DOCUMENTS

WO  WO-2015044700 A1 * 4/2015 ............... A47G 7/04

*Primary Examiner* — Magdalena Topolski
*Assistant Examiner* — William L Gmoser
(74) *Attorney, Agent, or Firm* — Gleam Law, PLLC; Neil Juneja

(57) ABSTRACT

Generally described, a growing container for a vertical rack system includes an inner container portion with a plurality of inlet perforations across a sidewall, an opening for plant growth, and a base panel with a plurality of outlet perforations. An outer container portion is configured to at least partially surround the inner container portion, and having a fluid inlet port and a fluid drain port. An upper seal and a lower seal are disposed between the inner container portion and the outer container portion on either side of the plurality of inlet perforations to allow a fluid from the fluid inlet port to cover the plurality of inlet perforations at any tilt angle of the growing container. The fluid drain port allows excess fluid drainage. A racking handle protrudes from the outer container portion with an internal angle corresponding to the tilt angle when coupled to a vertical rack system.

17 Claims, 4 Drawing Sheets

(56) References Cited

U.S. PATENT DOCUMENTS

| | | | | |
|---|---|---|---|---|
| 2015/0237811 A1* | 8/2015 | Marquez | ............... | A01G 9/023 47/66.6 |
| 2015/0296720 A1* | 10/2015 | Hashimoto | ............ | A01G 9/025 47/79 |
| 2015/0305255 A1* | 10/2015 | Daubenspeck | ........... | A01G 9/02 47/66.6 |
| 2016/0023225 A1* | 1/2016 | Decker | ................ | B05B 7/2424 239/8 |
| 2017/0258021 A1* | 9/2017 | Chiu | ..................... | A01G 31/02 |
| 2018/0027751 A1* | 2/2018 | Willingham | ............ | A01G 9/029 |
| 2018/0035618 A1* | 2/2018 | Brown | ..................... | A01G 9/02 |
| 2018/0213728 A1* | 8/2018 | Kelly | ..................... | A01G 9/042 |
| 2018/0228100 A1* | 8/2018 | Gergek | ............... | A01G 27/003 |
| 2019/0166778 A1* | 6/2019 | Hendrick | ............... | A01G 31/06 |
| 2019/0200543 A1* | 7/2019 | Lapierre | ................. | A01G 18/70 |
| 2019/0282003 A1* | 9/2019 | Otchere | ................. | A01G 9/02 |
| 2019/0373827 A1* | 12/2019 | Ensworth | ............... | A01G 25/06 |
| 2020/0008378 A1* | 1/2020 | Van Buuren | ............ | A01G 9/12 |

\* cited by examiner

METHODS AND CONFIGURATIONS OF A GROWING CONTAINER

BACKGROUND

Commercial agriculture operations attempt to maximize profits by increasing the growing density within a specified space, such as a climate controlled warehouse, greenhouse, or outdoor growing plot. In confined spaces having a specific volume (i.e., walls and a roof), a single layer growing operation may adequately cover the footprint of the space, but leaves a significant amount of the interior volume unused above and below the single growing layer.

To maximize the density within the growing space, some growers employ a "vertical farming" scheme, where plants are produced in vertically stacked layers, taking advantage of the height of the interior growing space for multiple layers of plant production. In conventional vertical farming systems, the density of the plant within the growing space is limited by the ability to provide water, nutrients, light, and air to the plants. In this regard, to provide these necessities to the vertically stacked layers, adequate space must be left between each layer for clearance. In one example, spacing the layers too close together in a conventional vertically stacked system causes inadequate light exposure and does not result in healthy growth. Likewise densely stacked layers of plants can present difficulties in irrigation and adequate movement of air essential for healthy growth of the plants.

In addition to the difficulties described above with respect to providing the necessary elements for healthy growth of the plant, conventional vertical farming systems typically require expensive buildings, can have cost prohibitive energy use, and can create more pollution than typical farming fields. These buildings are not gas-tight and cannot reclaim water from the environment. Therefore, a need exists for a vertical farming system to increase the potential growth density of a confined growing space, while providing access to the plants in the form of water, nutrients, light, and air. The present disclosure is directed to filling these and other needs.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
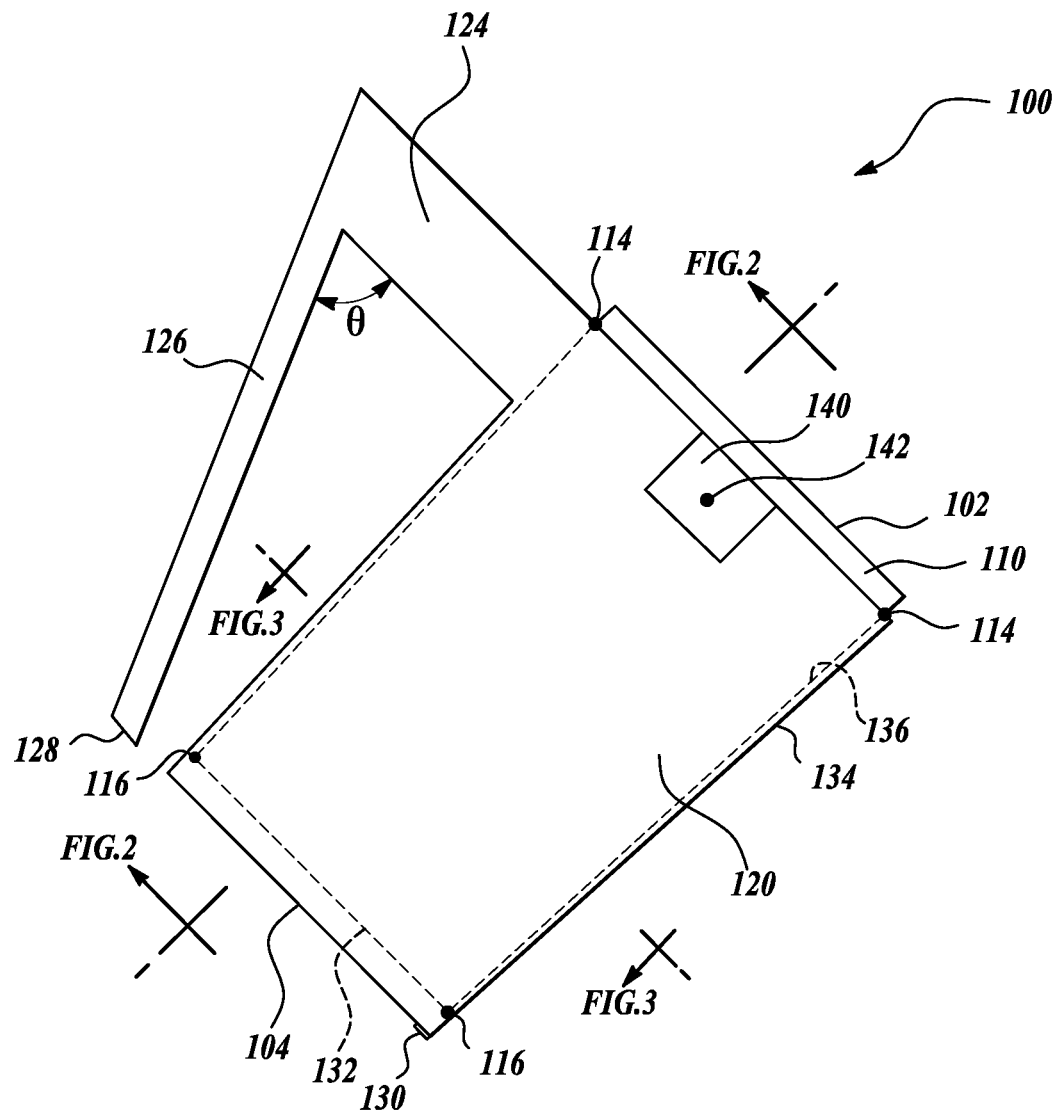
FIG. 1 is a side view of one embodiment of a growing container in accordance with aspects of the present disclosure.

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The following description provides several examples that relate to configurations of vertical farming, and in several embodiments, a growing container configured for dense vertical farming while providing access for essential growth components, including water, nutrients, light (for photosynthesis), and air. Some embodiments of the disclosed growing container are suitable for use with a vertical rack system that includes components configured to interface the growing container and removably couple the growing container to the vertical rack system.

In these configurations, the growing container may include features to minimize empty lateral space along the vertical rack between adjacent growing containers on the same row, e.g., by having substantially flat sides and/or nesting features configured to interface the adjacent growing container, among others. In other embodiments, the growing containers have a round configuration to provide structural rigidity, but may create gaps between the containers. In further embodiments, the growing container has any suitable shape configured to provide a volume for the growth of a plant and the specified interface with laterally adjacent and vertically adjacent growing containers.

In some embodiments, the growing containers described herein are suitable for use within gas-tight rooms, such that moisture can be reclaimed for use in irrigation. In such gas-tight rooms, it may be possible to reclaim up to 97% of the water used in irrigating the plants in the growing containers.

In some embodiments, the growing container has multiple container portions generally arranged in a nesting configuration. In this regard, the growing container has an inner container portion and an outer container portion disposed substantially around the inner container portion. As shown in the FIGURES, several seals may exist between the inner container portion and the outer container portion to allow irrigation distribution within the growing container. Additionally, one or more drains may be incorporated into the inner container portion and/or the outer container portion to allow removal of excess water during the growing process. As will be explained in greater detail below, the nesting configuration of the inner container portion and the outer container portion can allow irrigation of the soil within the growing container from any water inlet location positioned through the outer container portion. In some embodiments, the drain and the water inlet share the same port through the outer container portion, such as in a coaxial configuration, or a side-by-side configuration, among others.

In several embodiments, the growing container includes a racking handle attached to the outer container portion and configured to interface the vertical rack system. As will be discussed below, the racking handle may include surfaces disposed at an angle to cause the upper opening of the growing container to tilt outward from the vertical rack system. In these embodiments, the outward tilt of the growing container allows greater access for light to reach to the plant growing therein to promote healthy growth, even as the density of the growing containers increases on the vertical rack system. Conventional vertical farming systems cannot accommodate a degree of tilt of the growing container described herein as a result of insufficient irrigation systems, among other reasons. The embodiments of the present disclosure address these and other issues.

In embodiments that include the inner and outer container portions, the need for a permanent or separate container holder on the vertical rack is also eliminated. The modular nature of the growing containers allows for placement on the vertical rack according to clearance needs, for example, when growing taller or wider plants, and according to varietal light requirements, desired ease of access, and growing demand, among other reasons. Although the growing container is described herein in accordance with certain features and configurations, the embodiments described herein are exemplary and a person having ordinary skill in the art will recognize that other features and configurations are also within the scope of the present disclosure.

Turning now to FIG. 1, a growing container 100 is shown in accordance with embodiments of the present disclosure. The growing container 100 generally includes a proximal end 102 having an opening through which a plant (not shown) grows, and a distal end 104 near the base of the growing container 100. In some embodiments, an optional partial cover may be placed over the proximal end to retain the growing medium or contain a proximal seal (as will be described below). As described above, in some embodiments, the growing container 100 includes an inner container portion 110 and an outer container portion 120 substantially surrounding the inner container portion 110. In this regard, the nesting interface of the inner container portion 110 and the outer container portion 120 provides modularity to the vertical rack system and eliminates the need for a separate growing container holder on a vertical rack (not shown, but see, generally, FIG. 4), such as a stationary cage or bucket to hold the growing container 100. The vertical rack for use with growing containers 100 of the present disclosure is any suitable vertical rack to support the growing containers 100 and provide the desired stability and tilt.

The outer container portion 120 will now be described in greater detail. As shown in FIG. 1, the outer container portion 120 substantially surrounds the inner container portion 110 and includes features for removably coupling the outer container portion 120 to the vertical rack. The outer container portion 120 includes a racking handle body 124 extending from an outer surface of the outer container portion 120 near the proximal end 102. In other embodiments, the handle body 124 may be positioned at any surface between the proximal end 102 and the distal end 104 to adjust the placement of the plant within the growing container 100.

The racking handle body 124 may include a retainer bar 126 extending from an end of the racking handle body 124 toward the distal end 104 of the outer container portion 120. In some embodiments, the retainer bar 126 extends such that an end 128 of the retainer bar 126 is coplanar with the distal end 104; however, in other embodiments, the end 128 of the retainer bar 126 is disposed above the distal end 104 or past the distal end 104. As shown, the retainer bar 126 is disposed at an angle θ from the racking handle body 124 to provide the aforementioned outward tilt of the growing container 100 when the growing container 100 is removably coupled to the vertical rack (see FIG. 4). In some embodiments, the angle θ is between about 25° and 80°. In other embodiments, the angle θ is between about 35° and 75°. In further embodiments, the angle θ is between about 35° and 60°.

Figure 4:
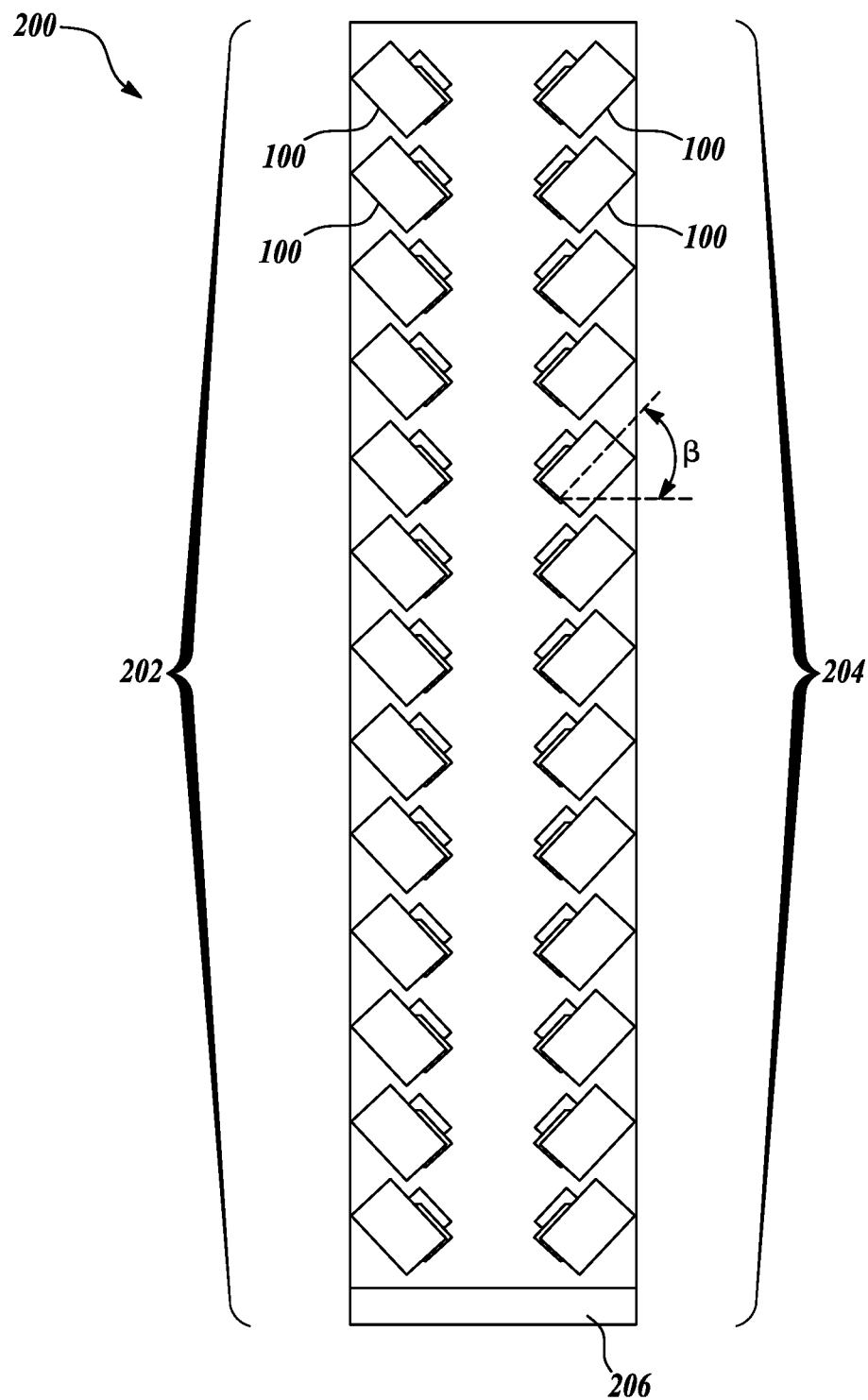
FIG. 4 is a side view of an embodiment of a vertical assembly of a plurality of growing containers of FIG. 1 in accordance with aspects of the present disclosure.

Turning briefly to FIG. 4, in an embodiment, the growing containers 100 are shown in an exemplary vertical rack system 200, where a plurality of growing containers 100 are arranged in vertical stacks to provide greater growing density, as previously described. When the growing containers 100 are placed in the vertical rack system 200, the racking handle body 124 and the retainer bar 126 position the growing container 100 at a tilt angle β with respect to the horizontal direction. In some embodiments, the tilt angle β is 50° or greater. In other embodiments, the tilt angle β is between about 55° and 70° from horizontal. In some embodiments, depending on the configuration of the portion of the rack interfacing the racking handle body 124 and the retainer bar 126, the angle θ is directly correlated to the tilt angle β, such that θ=β. In other embodiments, the angle θ and the tilt angle β are not directly correlated. In further embodiments, the angle and the tilt angle β are offset, for example, θ=β+10°. In other embodiments, any angle correlation between the angle θ and the tilt angle β is within the scope of the present disclosure.

In some embodiments, the outer container portion 120 substantially surrounds the inner container portion 110 and interfaces the inner container portion 110 through a one or more sealing members. In the illustrated embodiment, a proximal sealing member 114 is disposed near the proximal end 102 and provides an upper seal near the opening through which a plant grows. In some embodiments, the proximal sealing member 114 is an o-ring or similar seal positioned between the outer and inner container portions 120 and 110. In other embodiments, the proximal sealing member 114 may be integrated into either of the outer and inner container portions 120 and 110, or may be partially coupled to each portion to create the seal upon assembly. In a similar manner, a distal sealing member 116 is disposed near the distal end 104 and provides a lower seal near the drain of the outer container portion 120. As with the proximal sealing member 114, the distal sealing member 116 may be integrated into either of the outer and inner container portions 120 and 110, or may be partially coupled to each portion to create the seal upon assembly.

The proximal and distal sealing members 114 and 116 may be formed from rubber or any other suitable sealing material, or may be formed from the material of the inner and outer container portions 110 and 120. The distances between the proximal end 102 and the proximal seal 114, and the distal end 104 and the distal seal 116, can vary depending on the application of the growing container 100.

In other embodiments, the surfaces of the inner and outer container portions 110 and 120 may interface, such as with a waxy material, nylon composite, etc., and create a seal by use of interference and/or gravity. The advantages of the sealing configuration will be explained in greater detail below.

Figure 2:
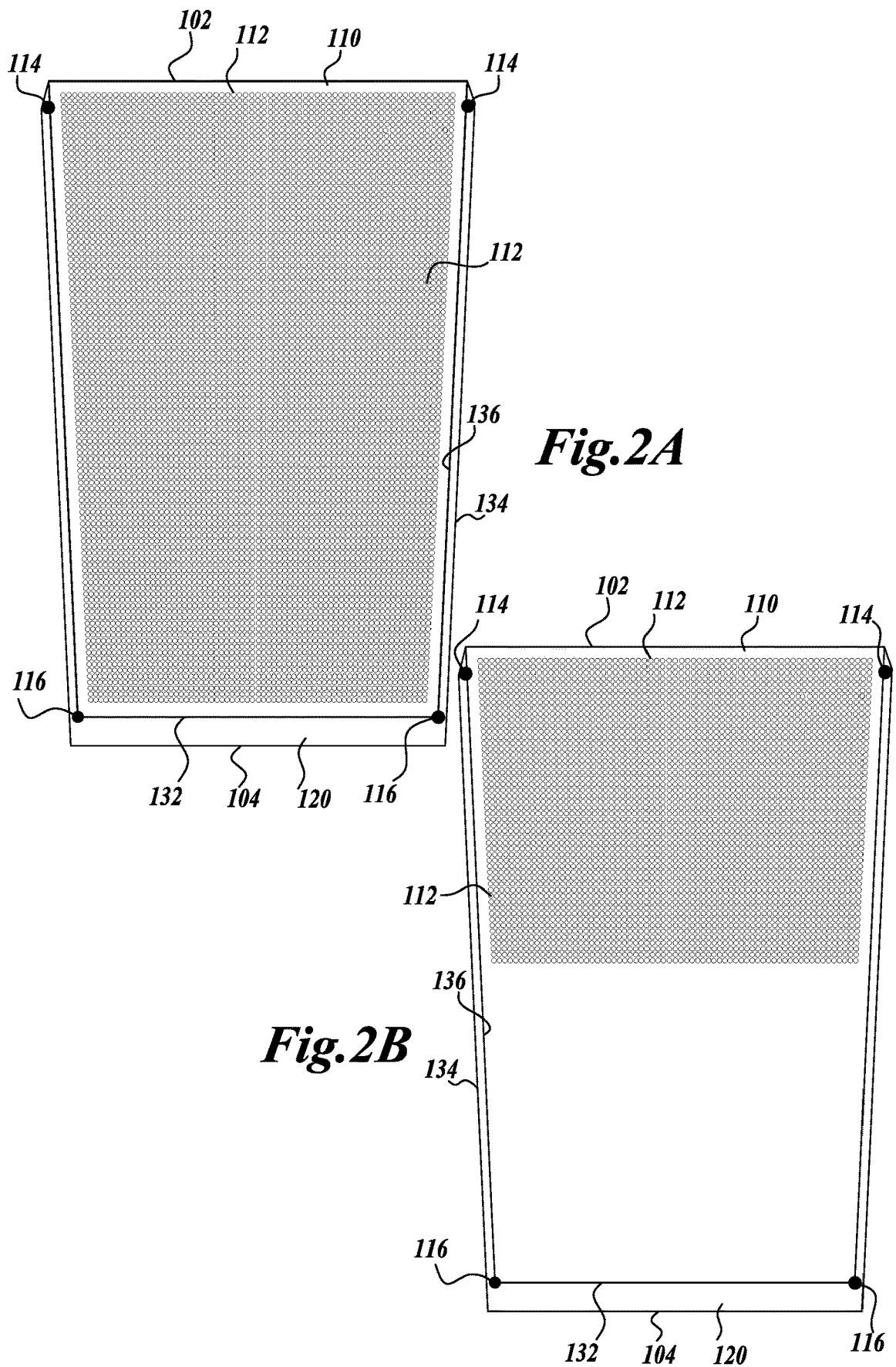
FIGS. 2A and 2B are cross-sectional views of the growing container of FIG. 1, showing the inner container portion.
Figure 3:
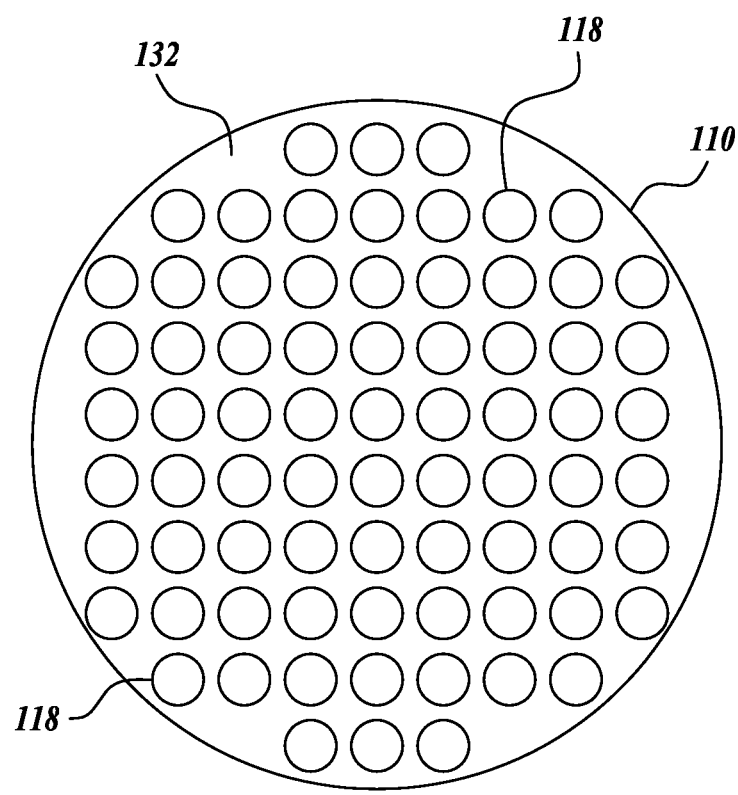
FIG. 3 is a cross-sectional view of the growing container of FIG. 1, showing a base panel.

Referring now to FIGS. 1-3, the inner container portion 110 is configured to interface the interior of the outer container portion 120. As shown in FIG. 1, in some embodiments, the inner container portion 110 extends beyond the proximal end 102 of the outer container portion 120, in some examples to provide a portion to grip and separate the inner container portion 110 from the outer container portion 120 during maintenance, assembly, disassembly, cleaning, etc. In other embodiments, the inner container portion 110 has any suitable length configuration with respect to the outer container portion 120. Likewise, the distance between a sidewall 136 of the inner container portion 110 and a sidewall 134 of the outer container portion 120 is of any suitable distance to provide adequate water coverage of the inlet perforations, as will now be explained in greater detail.

Turning to FIGS. 2A, 2B, and 3, the inner container portion includes a plurality of inlet and outlet perforations. Referring initially to FIGS. 2A and 2B, the sidewall 136 of the inner container portion 110 include a plurality of inlet perforations 112 configured to allow water into the growing medium for the plant. The inlet perforations 112 are disposed through the sidewall 136 of the inner container portion 110 and are in fluid communication with an inner cavity of the inner container portion 110 where the growing medium and root system of the plant reside. In some embodiments, the inner container portion 110 has a double wall with one of the wall including the inlet perforations 112, which, in these embodiments, eliminates requirement for the gap between the inner and outer container portions 110 and 120, and may eliminate the need for the proximal seal 114 and the distal seal 116. In these embodiments, an inlet port is located on the inner container portion 110.

When the inner container portion 110 is assembled within the outer container portion 120, a gap between the two components between the proximal and distal sealing member 114 and 116 allows water distribution along the surface area of the inner container portion 110 where the inlet perforations 112 reside. In some embodiments, the inlet perforations 112 are disposed in substantially the entire height of the inner container portion 110, as illustrated in FIG. 2A. In other embodiments, the inlet perforations 112 are located on only a portion of the sidewall 136 of the inner container portion 110, such as in a semi-circle configuration on only the half of the inner container portion 110, as illustrated in FIG. 2B, positioned upward when the growing container 100 is assembled and positioned at a tilt angle within the vertical rack or can follow a pattern, including spiral, vertical strips, stacked circles, etc.

In other embodiments, any configuration of the inlet perforations 112 is used to provide suitable irrigation to the growing medium in the inner cavity of the inner container portion 110. In further embodiments, the inlet perforations 112 have a uniform diameter across all of the inlet perforations 112, and can be of a size allowing for water pressure to allow coverage over the surface area of the inner container portion 110 between the proximal and distal sealing members 114 and 116. In other embodiments, the diameter of the inlet perforations 112 is non-uniform across the surface of the inner container portion 110, for example, where the diameter of the perforations are smaller on the side of the inner container portion 110 that is generally facing upward when the growing container 100 is in the vertical rack, while the diameter of the perforations is larger along the side of the inner container portion 110 generally facing downward when the growing container 100 is in the vertical rack. In further embodiments, the diameter of the inlet perforations 112 is any suitable configuration to allow irrigation of the growing medium within the cavity of the inner container portion 110.

In the illustrated embodiment of FIG. 3, the inner container portion 110 includes outlet perforations 118 disposed through a base panel 132 of the inner container portion 110. The outlet perforations 118 are configured to allow excess water in the cavity of the inner container portion 110 to drain into a plenum between the base panel 132 and the bottom of the outer container portion 120 (as shown in FIGS. 2A and 2B). Excess water can "drown" plants, and as such, the outlet perforations 118 provide a relief of excess water to keep the growing medium within the cavity of the inner container portion 110 at the specified moisture level for healthy growth. In some embodiments, the outlet perforations 118 are of a uniform diameter and sized to allow drainage of excess water without loss of the growing medium. In other embodiments, the outlet perforations 118 are non-uniform in diameter. The outer container portion 120 further includes an outlet 130 to provide drainage of the excess water expelled from the outlet perforations 118. In other embodiments, the outlet 130 is positioned anywhere along the plenum between the base panel 132 and the bottom of the outer container portion 120, and in some embodiments, may have a shape configured to readily flow excess water into the drain 130 to prevent standing water bacteria build-up causing issues with the health of the plant.

During irrigation of the growing medium within the cavity of the growing container 100, a water inlet, e.g., the water inlet 129, is positioned in any location along the sidewall 134 of the outer container portion 120 (or on the exterior wall or top ridge of a double wall interior container described above) and a water solution supply is introduced through the water inlet 129. The water solution may be plain water, filtered water, fertigated water, infused water, and/or treated water, or any combination thereof, among other sources of irrigation. In other embodiments, the irrigation may be misted air, infused misted air, or fertigated misted air, among others, to produce an aeroponics setup.

The diameter of the inlet perforations 112 creates a chamber between the sidewalls 136 and 134 of the inner and outer container portions 110 and 120, and between the proximal and distal sealing members 114 and 116, where the water enters and spreads along the chamber. At specified pressures of the water and diameters of the inlet perforations 112, the water travels across the chamber to interface a substantial portion of the inlet perforations 112. In this regard, the water can enter the cavity of the growing container 100 and provide irrigation to substantially surround the growing medium. The surrounding configuration of the irrigation allows a sufficient portion of the plant root system to access water even at the extreme tilt angles of the growing container 100 in the vertical rack system. In some embodiments, the pressure of the inlet water is between about 1 pound per square inch (PSI) and 40 PSI. In other embodiments, the pressure of the inlet water is between about 10 PSI and 40 PSI. In further embodiments, the pressure of the inlet water is between about 30 PSI and 40 PSI. After the irrigation of the growing medium occurs in the growing cavity within the growing container 100, excess water is allowed to drain through the outlet perforations 118 and through the outlet 130 for removal.

Returning to FIG. 1, in some embodiments, the inner and outer container portions 110 and 120 include a clocking feature 140 that ensures the orientation of the inner container portion 110 with respect to the outer container portion 120. The clocking feature 140 may include a mechanical alignment feature, such as an indentation. In some embodiments, a plurality of mechanical alignment features, such as the clocking feature 140, may be integrated into the inner and outer container portions 110 and 120. In further embodiments, the growing container 100 may include a locking aperture 142 to allow interference locking of the inner container portion 110 and the outer container portion 120.

In some embodiments, the outer container portion 120 remains stationary in the vertical rack, while the inner container portion 110 slides into the outer container portion 120. In other embodiments, the outlet 130 of outer container portion 120 is connected to a central drain line to allow excess water to exit the growing container 100 to a central collection system.

Referring again to FIG. 4, there is shown one embodiment of a vertical rack system 200 for arranging a first vertical stack 202 and/or a second vertical stack 204 of the growing containers 100. As described above, the vertical rack system 200 may be configured to position the growing containers at the tilt angle β from horizontal. In embodiments of the vertical rack system 200, a base 206 may be stationary or movable in one or more directions.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A growing container for a vertical rack system, comprising:
    an inner container portion comprising:
        a sidewall with a plurality of inlet perforations across at least a portion of the sidewall;
        an opening at a proximal end; and
        a base panel at a distal end with a plurality of outlet perforations;
    an outer container portion configured to at least partially surround the inner container portion, the outer container having a sidewall and a fluid drain port in fluid communication with the outlet perforations of the inner container portion;
    an upper seal circumscribing the sidewall of the inner container portion and disposed between the sidewalls of the inner container portion and the outer container portion to prevent liquid to flow inbetween, the upper seal being positioned above the plurality of inlet perforations and below the opening at the proximal end of the inner container portion;
    a lower seal circumscribing the sidewall of the inner portion and disposed between the sidewalls of the inner container portion and the outer container portion to prevent liquid to flow inbetween, the lower seal being positioned below the plurality of inlet perforations and above the plurality of outlet perforations; and
    a water inlet port extending through the sidewall of the outer container portion between the upper seal and the lower seal, wherein the water inlet port is in fluid communication with the plurality of inlet perforation.

2. The growing container of claim 1, further comprising a racking handle protruding from a proximal end of the outer container portion, the racking handle including an internal angle, wherein the internal angle is configured to correspond to a tilt angle between the sidewall of the outer container portion and a horizontal direction when the growing container is coupled to the vertical rack system.

3. The growing container of claim 2, wherein the internal angle is selected such that the tilt angle is between 50° and 80° from horizontal.

4. The growing container of claim 1, wherein the outer container portion is configured to input a fluid at a pressure between 10 PSI and 40 PSI, such that the fluid covers the entire surface of the sidewall of the inner container portion between the lower seal and the upper seal.

5. The growing container of claim 1, wherein the lower and upper seals are selected from the group consisting of an o-ring, a rubber strip, an interference seal, a gasket, and a tape.

6. The growing container of claim 1, wherein each one of the plurality of inlet perforations is smaller in diameter than each one of the plurality of outlet perforations.

7. The growing container of claim 1, wherein the outer container portion includes a clocking feature configured to interface a corresponding clocking feature on the inner container portion to position the inner container portion with respect to the outer container portion when the growing container is assembled.

8. A vertical farming system having a plurality of growing containers, the growing containers comprising:
    an inner container portion having a sidewall and a plurality of inlet perforations across at least a portion of the sidewall, an opening at a proximal end for plant growth, and a base panel at a distal end with a plurality of outlet perforations extending therethrough;
    an outer container having a sidewall and configured to at least partially surround the inner container portion, the outer container having a fluid drain port in fluid communication with the distal end of the inner container portion;
    an upper seal creating a fluid seal between the sidewalls of the inner container portion and the sidewall of the outer container portion and positioned above the plurality of inlet perforations and below the opening at the proximal end;
    a lower seal creating a fluid seal between the sidewalls of the inner container portion and the outer container portion and positioned below the plurality of inlet perforations and above the plurality of outlet perforations; and
    a water inlet positioned in a sidewall of the outer container portion between the upper seal and the lower seal and allowing water to be introduced inbetween to be in fluid communication with the plurality of inlet perforations, and wherein the lower seal prevents a fluid path from the water inlet to the fluid drain port without first traveling through at least one of the inlet perforations and at least one of the outlet perforations.

9. The vertical farming system of claim 8, further comprising a racking handle protruding from a proximal end of the outer container portion, the racking handle including an internal angle, wherein the internal angle is configured to correspond to a tilt angle between the sidewall of the outer container portion and a horizontal direction when the growing container is coupled to a vertical rack system.

10. The vertical farming system of claim 9, wherein the internal angle is selected such that the tilt angle is between 50° and 80° from horizontal.

11. The vertical farming system of claim 8, wherein the outer container portion is configured to input a fluid at a pressure between 10 PSI and 40 PSI, such that the fluid covers the entire surface of the sidewall of the inner container portion between the lower seal and the upper seal.

12. The vertical farming system of claim 8, wherein the plurality of inlet perforations are smaller in diameter than the plurality of outlet perforations.

13. The vertical farming system of claim 8, wherein the outer container portion includes a clocking feature configured to interface a corresponding clocking feature on the inner container portion to position the inner container portion with respect to the outer container portion when the growing container is assembled.

14. A growing container for a vertical rack system, comprising:
  an inner container portion comprising:
    a sidewall extending between a proximal end and a distal end to define a cavity and having a plurality of water inlet perforations extending therethrough;
    a plant-growing opening located at the proximal end; and
    a base panel at a distal end with a plurality of liquid outlet perforations extending therethrough;
  an outer container portion configured to at least partially surround the inner container portion with a gap defined at least partially inbetween, the outer container comprising:
    a sidewall having a water inlet port extending therethrough and between an upper seal and a lower seal, wherein the water inlet port is in fluid communication with the plurality of water inlet perforations;
    a base panel spaced-apart from the base panel of the inner container portion to define a plenum therebetween; and
    a fluid drain port extending through at least one of the sidewall and the base panel and being in fluid communication with the outlet perforations of the inner container portion;
  the upper seal circumscribing the sidewall of the inner container portion and disposed between the sidewalls of the inner container portion and the outer container portion to prevent liquid to flow inbetween, the upper seal being positioned above the plurality of inlet perforations of the inner container portion and below the plant-growing opening; and
  the lower seal circumscribing the sidewall of the inner portion and disposed between the sidewall of the inner container portion and the sidewall of the outer container portion to prevent liquid to flow inbetween, the lower seal being positioned below the plurality of inlet perforations and above the plurality of outlet perforations;
  wherein water introduced in the growing container through the water inlet port sequentially flows in the gap defined between the inner and outer container portions and between the upper and the lower seals, enters into the cavity of the inner container portion through the water inlet perforations, flows outwardly of the inner container portion and enters into the plenum through the liquid outlet perforations and then, flows outwardly of the growing container through the fluid drain port.

15. The growing container as claimed in claim 14, wherein the fluid drain port of the outer container portion is defined in the base panel thereof.

16. The growing container as claimed in claim 14, wherein the lower and upper seals are selected from the group consisting of an o-ring, a rubber strip, an interference seal, a gasket, and a tape.

17. The growing container as claimed in claim 14, wherein each one of the plurality of inlet perforations is smaller in diameter than each one of the plurality of outlet perforations.

* * * * *